INVENTORS:
DITLEV P. MADSEN
JOHN H. PIKEL

# United States Patent Office 3,655,702
Patented Apr. 11, 1972

3,655,702
CONTINUOUS RENDERING PROCESS
Ditlev P. Madsen, Palos Park, and John H. Pikel, Oaklawn, Ill., assignors to Chemetron Corporation, Chicago, Ill.
Filed Dec. 16, 1968, Ser. No. 784,100
Int. Cl. C11b 1/12
U.S. Cl. 260—412.6
7 Claims

ABSTRACT OF THE DISCLOSURE

There is provided an improved method and apparatus for the continuous rendering of fatty material, wherein the material to be rendered is first passed through a known type of rendering evaporator for separating fat and cracklings from the raw material. The material is fed into a substantially airfree state. A controlled pressure is maintained in the rendering evaporator to aid in the removal of moisture. The treated material is discharged in a continuous process from the rendering evaporator through a suitable discharge outlet. An airlock is provided with the discharge outlet for preventing the entry of air into the rendering evaporator through the discharge outlet.

---

The present invention relates to a continuous rendering method and apparatus and, more particularly, to a method and apparatus for the continuous rendering of fatty raw material in a slaughterhouse and the like.

Heretofore it has been known commercially to provide for the continuous rendering of fatty raw material by subjecting the raw material to heat for a period of time. One such continuous rendering device is illustrated in Letters Patent of the U.S. No. 3,410,882 granted Nov. 12, 1968. The raw material passing through the rendering evaporator is subjected in the known manner to heat and to controlled pressure conditions to provide for separation of fat from cracklings and to sterilize the raw material as it passes through the continuous evaporator. It has been found that pressure conditions in the rendering evaporator below atmospheric facilitate in the removal or drawing off of the moisture of the material undergoing treatment.

Preferably the rendering takes place in an oxygen-free atmosphere since the oxygen may oxidize and deteriorate some of the material undergoing treatment. To this end the raw material is fed into a substantially airfree rendering evaporator. However difficulty has heretofore been experienced with the entry of air through the discharge of the rendering evaporator. This is especially true when the rendering evaporator is maintained under vacuum relative to the atmosphere. Air entry into the evaporator is undesirable first, as pointed out above, because the air will oxidize certain of the elements undergoing treatment, and secondly because the air will create airlock in the condensing equipment providing the vacuum to the rendering evaporator. Thus it becomes necessary, if air enters the rendering evaporator in a vacuum condition, that such air be pumped from the condenser in order to permit the drawing of the necessary vacuum by the condenser. It has been found that under these conditions the vacuum within the rendering evaporator will fluctuate, causing pulsing of the air through the discharge into the rendering evaporator.

Accordingly it is an object of the present invention to provide a new and improved continuous rendering apparatus which overcomes the above mentioned difficulties.

Another object of the present invention is to provide a new and improved continuous rendering method which overcomes the above mentioned difficulties.

Yet another object of the present invention is the provision of a new and improved continuous rendering apparatus.

A further object of the present invention is the provision of an improved rendering apparatus wherein the rendering takes place in an airfree condition.

Yet another object of the present invention is the provision of a new and improved continuous rendering method.

Still another object of the present invention is the provision of a new and improved continuous rendering method wherein the rendering takes place in an airfree condition.

Another object of the present invention is the provision of a continuous rendering method wherein the finish rendering may be accurately controlled.

Still another object of the present invention is the provision of a continuous rendering method wherein sterilization of the product may be accurately controlled.

Further objects and advantages of the present invention will become apparent as the following description proceeds and the features of novelty which characterize the present invention will be pointed out with particularity in the claims annexed to and forming a part of this specification.

In accordance with these and other objects there is provided a new and improved continuous rendering apparatus of the type including a continuous rendering evaporator for separating fat from cracklings. Inlet means are provided for supplying raw material in substantially airfree relation into the rendering evaporator. Means are provided for maintaining controlled pressure conditions, for example, drawing and maintaining a vacuum, in the rendering evaporator. However, the rendering process also functions satisfactorily under pressure conditions slightly above atmospheric. Means are also provided for discharging continuously the treated material from the rendering evaporator. In accordance with the present invention an airlock is provided in the discharge means for preventing the entry of air into the rendering evaporator means through the discharge outlet and for maintaining the desired pressure differential through the discharge.

In a particular embodiment of the present invention, the discharge opening communicates with a holding tank, and the airlock is defined by an hydraulic head of treated material across the discharge of the rendering evaporator. If desired, heat may be added to the holding tank and, if desired, the holding tank may be maintained in an airfree atmosphere so that finish rendering and sterilization of the treated material can take place in the holding tank. Such heat may be added by heating the holding tank or recirculating hotter fats to the holding tank. Since the time of holding in the holding tank may be accurately regulated, the finish rendering and sterilization of the product may be closely closely controlled.

The present invention is also directed to a continuous rendering process wherein raw material is continuously heated in a continuous rendering process to separate fat from the cracklings thereof. Raw material is continuously introduced into a substantially airfree rendering vessel under controlled pressure conditions for treatment. An airtight seal is maintained through the discharge outlet of the vessel to provide for substantially oxygen-free rendering of the raw material. In accordance with one embodiment, a vacuum is continuously drawn on the rendering vessel during the heating or rendering process, and material is continuously discharged from the continuous rendering vessel through the airtight seal.

For a better understanding of the present invention, reference may be had to the accompanying drawings wherein:

FIG. 3 is a schematic view of a continuous rendering apparatus and method according to another embodiment of the present invention;

Figure 1:
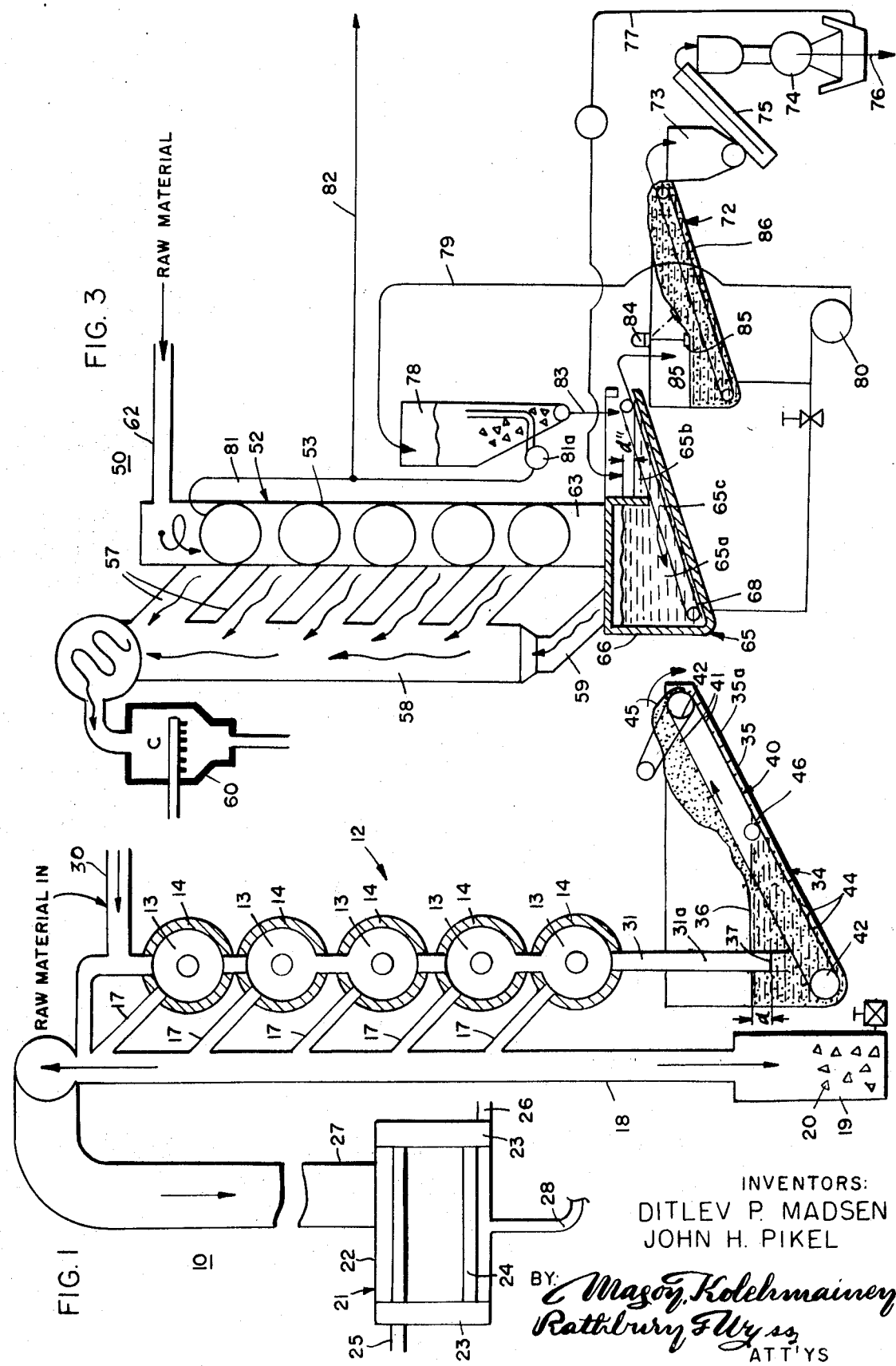
FIG. 1 is a schematic elevational view of a continuous rendering apparatus and method according to the present invention.

Referring now to the drawings, and particularly to the embodiment of FIG. 1 thereof, there is illustrated a continuous rendering apparatus 10 according to the present invention. The continuous rendering apparatus 10 includes a continuous rendering evaporator 12, of a type known in the art. Briefly, however, the rendering evaporator 12 in the illustrated embodiment provides a vessel in which the raw material undergoing treatment may be heated to separate the fat from the cracklings thereof, and further is generally subjected to a controlled pressure condition to aid in the drying of the product by removal of the moisture. To this end there is provided a plurality of treatment tubes 13, each containing a steam jacket 14 through which steam is passed at a suitable temperature to maintain the desired internal temperature within the treatment tubes 13. Within the treatment tubes 13 may be provided a suitable power driven agitator 49 to agitate the material undergoing treatment and to assure that the material passes downwardly from tube to tube through the rendering evaporator. Moreover each of the treatment tubes 13 includes a vapor outlet 17, all of which communicate with a vertical carryover tube 18. The bottom of the carryover tube 18 is provided with suitable sump 19 or other means for collecting solid carryover 20.

A condenser 21, here shown as a surface condenser, is connected to provide a controlled pressure condition through the carryover tube 18 into the treatment tubes 13. As is known, the surface condenser 21 includes a cylindrical shell 22 having bulkheads defining water chambers 23 interconnected by a plurality of tubes 24. Cooling water is passed through the tubes 24 from a water inlet 25 to a water outlet 26. Water vapor from the carryover tube 18 is admitted to the shell 22, through the vapor conduit 27 and is condensed on the tubes 24. The condensate may be pumped from the condenser through a condensate outlet 28.

To provide for the continuous flow of material through the rendering evaporator 12, there is provided a suitable material inlet 30 opening into the uppermost one of the treatment tubes 13, and a suitable material outlet 31 discharging from the lowermost one of the treatment tubes 13.

From the above brief description, the operation of the rendering evaporator 12 is believed clear. However, briefly, it will be understood that raw material to undergo treatment is introduced through the material inlet 30, so as to pass sequentially through the treatment tubes 13 from the uppermost one to the lowermost one, then to be discharged from the material outlet 31. The treatment tubes 13 are heated so as to provide the necessary breakdown or separation of fat from cracklings of the raw material and, at the same time, to sterilize the material passing through the rendering evaporator 12. The surface condenser 21, acting on the moisture drawn from the material undergoing treatment, will provide a controlled pressure within the treatment tubes.

In accordance with the present invention, there is provided a suitable airlock to prevent the ingress of atmospheric air into the rendering evaporator. The rendering evaporator 12 discharges into a holding tank 34 formed of a tank shell 35 receiving the discharge of the rendering evaporator 12. The material outlet 31 extends below the level of fluid 36 within the tank 34 to near the bottom thereof. Thus the lower end of the material outlet 31 defines a standpipe 31a which will maintain a level of fluid 37 a distance $d$ from the level 36 representing the pressure differential within the rendering evaporator 12 defined in terms of inches of fatty fluid.

It will be understood that the discharge of the rendering evaporator 12 is comprised of liquids in the form of fat and solids such as cracklings. The holding tank 34 may serve as a finish renderer if desired, adding heat to the treated material and holding the material within the holding tank 34 a predetermined period of time. To facilitate the removal of the solids, there is provided a conveyer 40 along an upwardly and forwardly inclined wall 35a of the shell 35, the conveyer including a pair of conveyer chains 41 wrapped around spaced sprocket wheels 42. A plurality of spaced bars 44 are carried by the conveyer chains. The conveyer moves in the direction of the arrows, the lower run moving downwardly and the upper run moving forwardly and upwardly so that the bars 44 drag pieces of solid material with them. The solids will build up over the front of the holding tank 34, along a level indicated at 45. A drain 46 is provided for the removal of the liquids.

Figure 2:
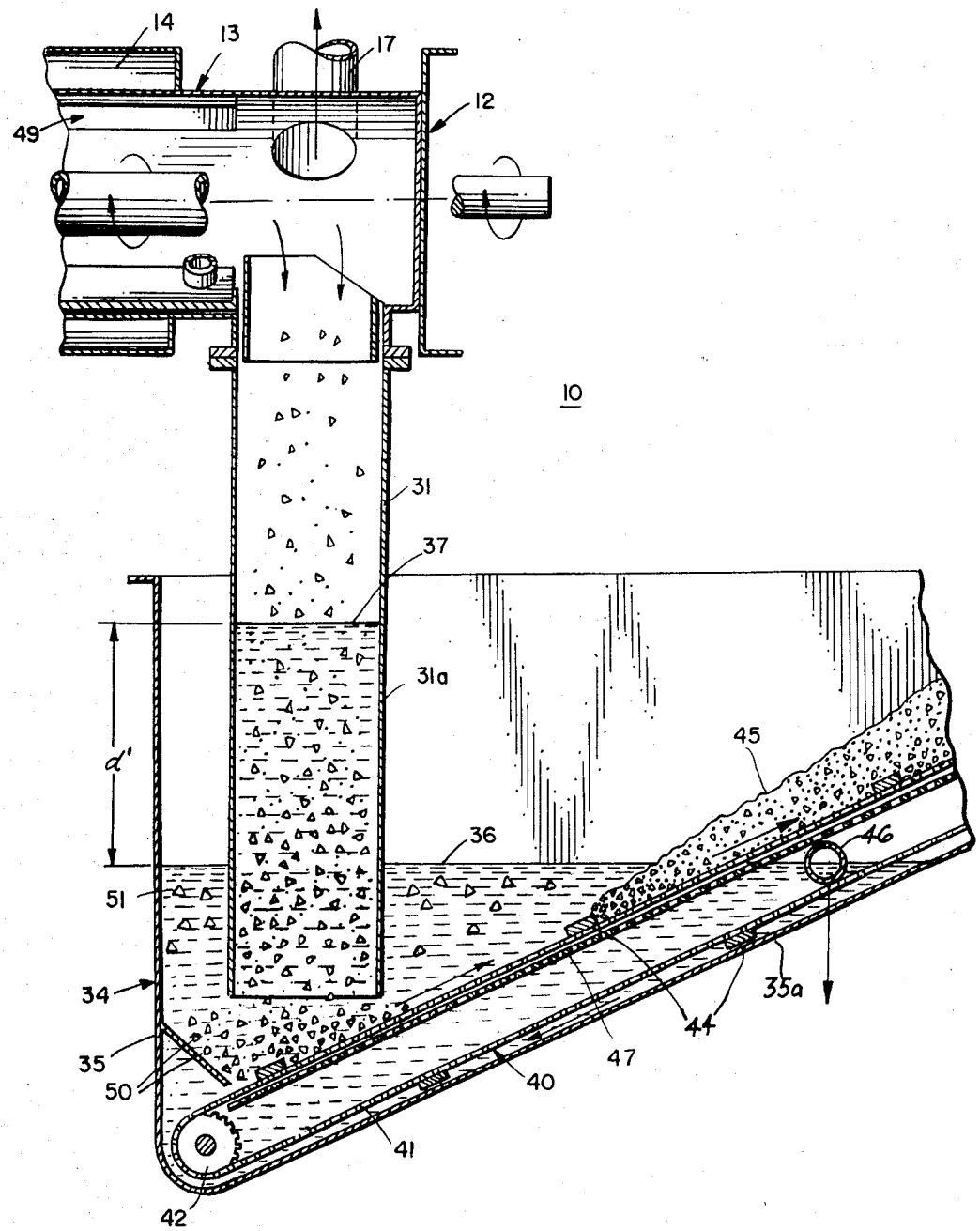
FIG. 2 is a cross sectional view of a holding tank and discharge outlet of a continuous rendering device illustrating an airtight discharge seal in a vacuum rendering condition.

FIG. 2 illustrates an embodiment of the invention wherein a vacuum is drawn on the condenser in the rendering evaporator 12. The structure of FIGS. 1 and 2 is otherwise identical. Accordingly the same components of FIGS. 1 and 2 are identified by the same reference numerals.

Referring now to FIG. 2, the continuous rendering apparatus 10 includes the continuous rendering evaporator 12 for the treatment of raw material under substantially airfree and controlled pressure conditions, the pressure within the evaporator 12 being below atmospheric in the illustrated embodiment. Thus the rendering evaporator 12 in the illustrated embodiment provides a vessel in which the raw material undergoing treatment may be heated to separate the fat from the cracklings thereof, and further is generally subjected to a vacuum to aid in the drying of the product by removal of the moisture. To this end there is provided the plurality of treatment tubes 13, each containing the steam jacket 14 through which steam is passed at a suitable temperature to maintain the desired internal temperature within the treatment tubes 13. Within the treatment tubes 13 may be provided a suitable power driven agitator 49 to agitate the material undergoing treatment and to assure that the material passes downwardly from tube to tube through the rendering evaporator. Moreover each of the treatment tubes 13 includes the vapor outlet 17, all of which communicate with a vertical carryover tube. A condenser is connected to the carryover tube and selected to draw a vacuum within the rendering evaporator. It will be understood that raw material to undergo treatment is introduced so as to pass sequentially through the treatment tubes 13 from the uppermost one to the lowermost one (only one of which is shown in FIG. 2), then to be discharged from the material outlet 31. The treatment tubes 13 are heated so as to provide the necessary breakdown or separation of fat from cracklings of the raw material and, at the same time, to sterilize the material passing through the rendering evaporator 12. The condenser acting on the moisture drawn from the material undergoing treatment, will maintain a vacuum within the treatment tubes. This vacuum may be controlled over a desired range, and in a particular embodiment may be in the range of two inches to about eighteen inches of fatty fluid.

In accordance with the present invention, there is provided a suitable airlock to prevent the ingress of atmospheric air into the rendering evaporator. The rendering evaporator 12 discharges into a holding tank 34 formed of a tank shell 35 receiving the discharge of the rendering evaporator 12. The material outlet 31 extends below the level of fluid 36 within the tank 34 to near the bottom thereof. Thus the lower end of the material outlet 31 defines a standpipe 31a which will maintain a level of fluid 37 a distance d' above the level 36 representing the vacuum within the rendering evaporator 12 defined in terms of inches of fatty fluid.

It will be understood that the discharge of the rendering evaporator 12 is comprised of liquids in the form of fat and solids such as cracklings. The holding tank 34 may serve as a finishing renderer if desired, supplying heat to the treated material as by the addition of heat or by the recirculation of heated fats to the tank. The material may be held within the holding tank 34 a predetermined period of time. Fully cooked or dried cracklings, identified as 50, will sink to the bottom of the fatty mixture, where they will be removed by the conveyor 40. Solids containing bound moisture, identified by 51, are light weight and will float so as to soak in the heated fat mixture until they are dehydrated and sink.

The conveyer 40 is positioned over the upwardly and forwardly inclined wall 35a and includes the pair of conveyer chains 41 wrapped around spaced sprocket wheels 42, only one of which is illustrated in FIG. 2. The plurality of spaced bars 44 are carried by the conveyer chains. The conveyer moves in the direction of the arrows, the lower run moving downwardly and the upper run moving forwardly and upwardly so that the bars 44 drag pieces of solid material with them. The dried solids will build up over the front of the holding tank 34, along a level indicated at 45. A drain 46 is provided for the removal of liquid fats.

In order to provide for percolating or draining of the fatty materials from the solids, there is provided a perforated percolating plate 47 spaced directly below the upper rack of the conveyer 40 to further serve as a scraper surface for the bars 44 in the upper run. Moreover, the cracklings themselves serve as a filter bed for the mixture. Advantageously the soaking of the solids containing bound moisture permits finish rendering to occur at minimum temperature resulting in a finished product of high quality and light color. The liquid seal according to the present invention is positive, and is economically provided without any moving parts to minimize maintenance.

FIG. 3 illustrates another embodiment of a rendering apparatus 50 according to the present invention. As therein illustrated, there is provided a rendering evaporator 52, similar to that heretofore described, including a plurality of steam jacketed treatment tubes 53 through which passes the material undergoing treatment. Each of the treatment tubes 53 is provided with a vapor outlet 57 opening into a carryover tube 58. A jet type or atmospheric type condenser 60 draws a vacuum on the rendering evaporator 52 of a desired magnitude. A suitable material inlet 62 opens into the rendering evaporator 52 above the uppermost one of the treatment tubes 53 so that the material undergoing treatment will move downwardly from one tube to the other.

In accordance with the embodiment of FIG. 3, there is provided a two-compartmented holding tank 65 formed of a shell 66 and having a first compartment 65a closed at its top but communicating with a second compartment 65b at its lower end through a connecting passageway 65c. As illustrated in FIG. 3, both the material outlet 63 from the treatment tubes 53, and a sump outlet 59 from the vapor outlet 57 open into the upper wall of the closed compartment 65a. A suitable conveyer 68 along the lower or bottom surface of the holding tank 65 removes the solids, and the liquids in the tank will overflow through a discharge 69 from the holding tank 65. Both the solids from the conveyer 68 and the fatty fluids from the discharge 69 spill into a second holding tank 72 which is similar in construction to the holding tank 34 heretofore described. One or both of the holding tanks 65 and 72 may be used for finish rendering and to this end may, if desired, have heat supplied and have a controlled settling or soaking time within the tanks.

The discharge from the holding tank 72 may be further processed in any desired manner, and in the illustrated embodiment the discharge first flows into a storage tank 73 and into a press 74 through a suitable conveyer 75. The press 74 is effective to press the fat or grease from the cracklings, the cracklings being removed from the press, as indicated at 76, and the grease being recirculated into the system, as, back into the second compartment 65b of the holding tank 65 through a fluid conduit 77. Moreover the fatty fluids from one or both of the holding tanks 65 and 72 may be returned to a fat reserve and fine settling tank 78 through a fluid conduit 79 and pump 80. The fluids from the fine settling tank 78 may either be returned to the rendering evaporator through a fluid conduit 81 by a pump 81a, or to suitable storage through a fluid conduit 82. The fine solids removed from the fine settling tank 78 may be processed in any desired manner and, in the illustrated embodiment, are returned to the second compartment 65b of the holding tank 65 through a conduit 83. A suitable level gauge 84 having a senser 85 which will swing from the position shown in solid to the position shown in phantom along the level of the solids, can be provided to control the running of a conveyer 86 provided in the holding tank 72.

From the above description the operation of the improved airlock is believed clear. Briefly, however, there will be a vacuum drawn in the closed or first compartment 65a of the holding tank 65 through the opening therein from the sump outlet 59 and the material outlet 63. Thus a fluid differential d'' will be drawn on the levels of the fatty fluids between the first and second compartments 65a and 65b representing the existing vacuum in the rendering evaporator 52.

Figure 4:
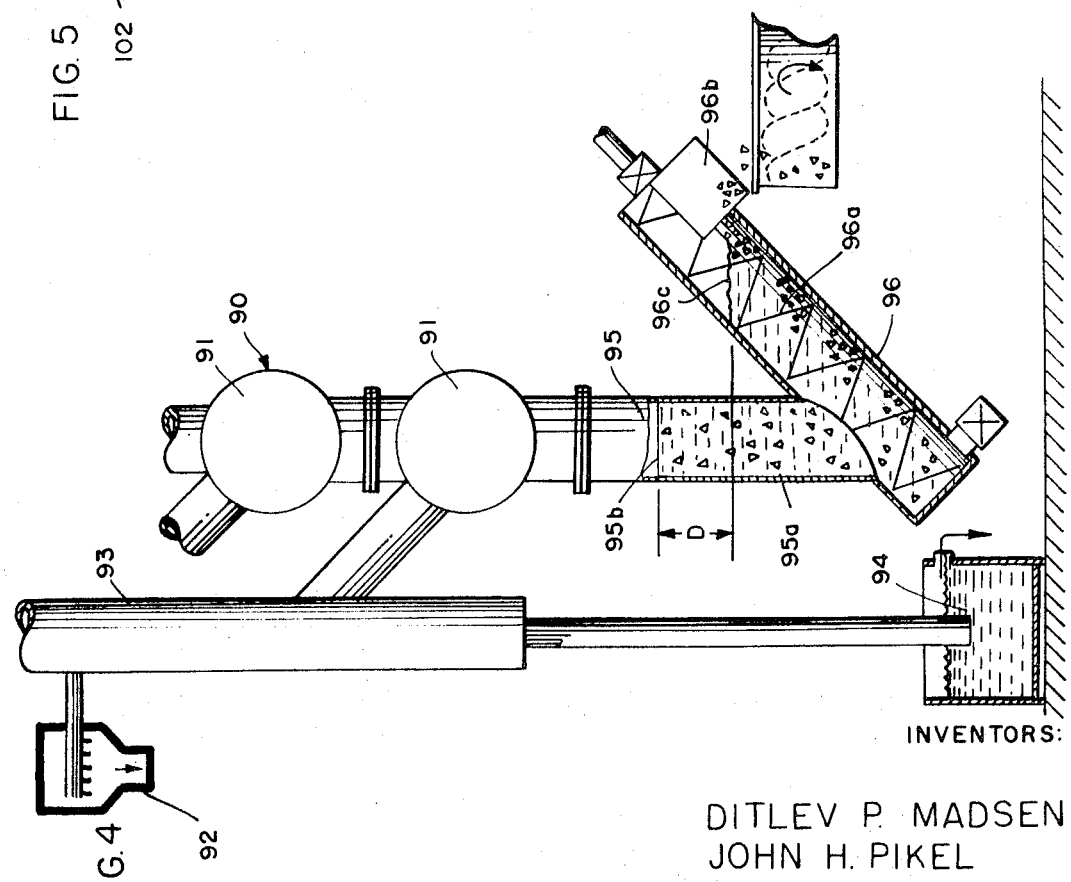
FIG. 4 is a somewhat schematic view of another embodiment of an airlock in accordance with the present invention.

FIG. 4 illustrates another form of airlock on the discharge of a rendering evaporator. Briefly, there is illustrated a rendering evaporator 90 consisting of the conventional treatment tubes 91 opening into a carryover tube 93. A jet condenser 92 maintains a controlled pressure differential such as a vacuum within the rendering evaporator 90. The carryover tube 93 opens into a suitable sump 94. The treated material from the rendering evaporator 90 is discharged through a material outlet 95. The material outlet 95 defines a standpipe 95a extending from an upwardly inclined screw conveyer 96. The screw conveyer 96 includes an auger 96a which raises the solids, and the fatty liquids spill over a discharge spout 96b, defining a liquid level 96c above the bottom of the standpipe 95a. The vacuum maintains a fatty liquid level 95b within the standpipe 95a corresponding to a pressure differential D representing inches of fatty fluid.

Figure 5:
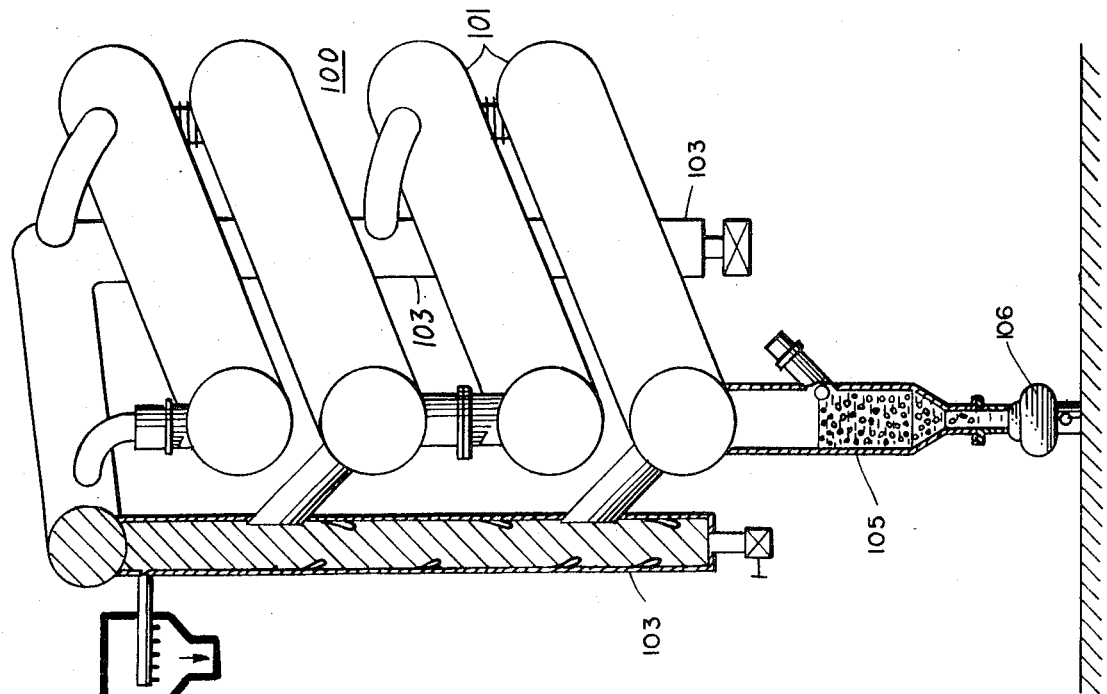
FIG. 5 illustrates yet another embodiment of airlock according to the present invention.

FIG. 5 illustrates yet another embodiment of an airlock according to the present invention. As therein illustrated there is a rendering evaporator 100 having a plurality of treatment tubes 101 on which is maintained a controlled pressure differential such as a vacuum by a jet type condenser 102. Alternate treatment tubes 101 open into respective ones of a pair of carryover tubes 103. A suitable material outlet 105 from the rendering evaporator 100 forms a surge tank and reservoir defining a standpipe. A centrifugal pump 106 connected to the bottom of the material discharge 106 removes the liquid and solids therefrom against the suction of the vacuum within the rendering evaporator 100. The standpipe 105 is sufficiently high so that a positive head of liquids and solids is continuously maintained on the intake of the pump 106 forming an airlock and preventing the ingress of atmospheric air.

From the above description of the improved rendering apparatus, it will be understood that means are provided for preventing the ingress of atmospheric air into the rendering evaporator through the material outlet. Such atmospheric air would otherwise cause difficulties both in the oxidation of the material undergoing treatment, and in the formation of an airlock in the condenser of the system which controls the system pressure. Advantageously the controlled pressure aids in the removal of moisture from the material undergoing treatment. The airlock is positive, and, in the preferred embodiments, is formed without moving parts.

Although the present invention has been described by reference to only a single embodiment thereof, it will be apparent that numerous other embodiments and modifications may be devised by those skilled in the art, and it is intended by the appended claims to cover all modifications and embodiments which will fall within the true spirit and scope of the present invention.

What is claimed as new and desired to be secured by Letters Patent of the United States is:

1. A continuous rendering process comprising the steps of:
    (a) continuously introducing into a substantially airfree vessel animal tissue containing fats and solids separable upon heating;
    (b) maintaining the animal tissue in the vessel under controlled pressure while heating the animal tissue in the vessel so as to form a fluid mixture of separated fats and solids;
    (c) discharging the fluid mixture of fats and solids into a tank, which is open to the atmosphere, through a conduit having an inlet above and an outlet below the level of the fluid mixture in the tank; and
    (d) removing the solids from the tank and draining fats from the tank so as to maintain the level of the mixture in the tank at a predetermined distance above the outlet of the conduit.

2. The process of claim 1, wherein the controlled pressure in the vessel is above atmospheric pressure, and wherein the fluid is maintained in the conduit at a level below the level of the fluid in the tank by reason of the differential between the controlled pressure in the vessel and atmospheric pressure.

3. The process of claim 1, wherein the controlled pressure in the vessel is below atmospheric pressure, and wherein the fluid is maintained in the conduit at a level above the level of the fluid in the tank by reason of the differential between the controlled pressure in the vessel and atmospheric pressure.

4. The process of claim 1 comprising the further step of heating the fluid mixture of fats and solids in the tank.

5. A continuous rendering process comprising the steps of:
    continuously supplying animal tissue containing separable liquid fats and solids into a substantially airfree rendering vessel;
    maintaining said tissue under controlled pressure during heating of the same to a temperature causing liquid fats and solids to separate;
    venting vaporized moisture from said vessel driven off from said animal tissue by the heating thereof;
    continuously discharging a fluid mixture of liquid fats and solids from said vessel into a tank vented to the atmosphere; and
    maintaining an hydraulic lock of liquid fat between said tank and vessel to provide an airlock against the entry of outside air into said rendering vessel as said fluid mixture is continuously discharged into said tank.

6. The continuous process of claim 5 including the step of condensing said vented moisture.

7. The continuous process of claim 5 including the step of separating said solids from said liquid fat in said tank by elevation of said solids above the liquid level therein.

References Cited
UNITED STATES PATENTS

| | | | |
|---|---|---|---|
| 3,057,699 | 10/1962 | Allbright et al. | 260—412.6 |
| 3,158,634 | 11/1964 | Marsh | 260—412.6 |
| 3,410,882 | 11/1968 | Macy et al. | 260—412.6 |
| 3,471,534 | 10/1969 | Jones | 260—412.6 |

LEWIS GOTTS, Primary Examiner

J. R. BROWN, Assistant Examiner

U.S. Cl. X.R.

23—280